United States Patent [19]
Okamoto et al.

[11] Patent Number: 5,228,036
[45] Date of Patent: Jul. 13, 1993

[54] FRAME SYNCHRONIZATION STABILIZER

[75] Inventors: Naoki Okamoto; Masao Miyazaki, both of Nara; Tomozo Ohta, Ikoma, all of Japan

[73] Assignee: Sharp Kabushiki Kaisha, Osaka, Japan

[21] Appl. No.: 683,454

[22] Filed: Apr. 10, 1991

[30] Foreign Application Priority Data

Apr. 10, 1990 [JP] Japan ................... 2-95852

[51] Int. Cl.$^5$ ................................ H04J 3/06
[52] U.S. Cl. .................. 370/105.1; 375/116
[58] Field of Search .......... 370/105.1, 103, 106, 370/100.1, 105.4; 375/106, 107, 76, 114, 116

[56] References Cited

U.S. PATENT DOCUMENTS

| | | | |
|---|---|---|---|
| 3,537,069 | 10/1970 | Houten | 340/146.1 |
| 4,002,845 | 1/1977 | Kaul et al. | 179/15 |
| 4,404,675 | 9/1983 | Karchevski | 375/116 |
| 4,747,116 | 5/1988 | Yajima et al. | 375/116 |
| 4,748,623 | 5/1988 | Fujimoto | 370/105.1 |
| 4,768,192 | 8/1988 | Pattavina et al. | 370/106 |
| 4,984,238 | 1/1991 | Watanabe et al. | 370/105.1 |
| 5,018,140 | 5/1991 | Lee et al. | 370/105.1 |
| 5,062,107 | 10/1991 | Heiss et al. | 370/100.1 |

OTHER PUBLICATIONS

T. A. Hawkes, et al., Construction and Performance of a PCM Frame Synchronizer with Self-Varying Threshold, IEEE Transactions on Communication Technology, Feb. 1968, vol. 16, No. 1.
Patent Abstracts of Japan Publication No. JP59158168, dated Sep. 7, 1984.
Patent Abstracts of Japan Publication No. JP58215842, dated Dec. 15, 1983.

*Primary Examiner*—Douglas W. Olms
*Assistant Examiner*—Shick Hom
*Attorney, Agent, or Firm*—David G. Conlin; George W. Neuner

[57] ABSTRACT

A frame synchronization stabilizer for stabilizing frame synchronization of received data has a generation circuit for generating a reference pattern which is the same as a predetermined frame synchronization pattern contained in data being transmitted. The stabilizer further has a comparison circuit for comparing, bit by bit, a data pattern in a synchronization pattern area of each frame of the received data with the reference pattern from the generation circuit. The comparison circuit outputs a mismatch pulse each time when a mismatch bit is detected by the comparison, and outputs a match pulse each time when it is detected that the data pattern is fully matched with the reference pattern. The number of the mismatch pulses from the comparison circuit is counted by a first counter. The first counter outputs an out-of frame detection signal when a counted value exceeds a particular value and is reset based upon the match pulse from the comparison circuit.

10 Claims, 6 Drawing Sheets

FRAME SYNCHRONIZATION STABILIZER

BACKGROUND OF THE INVENTION

1. Field of the Invention

The present invention relates to a frame synchronization stabilizer for stably synchronizing frames of received data in digital data transmission.

2. Description of the Related Art

In data transmission such as digital data communication, a transmission side transmits a data stream with a frame synchronization pattern for synchronizing the data stream, frame by frame, to a reception side. The reception side identifies the synchronization pattern and thereby detects the end of each frame so as to correctly obtain the data. In synchronizing each frame, a frame synchronization stabilizer is used so as to stabilize the synchronization of frames against a disturbance which may takes place over a transmission line.

The frame synchronization stabilizer is provided with both a front stabilizing function for preventing it from determining an instantaneous pulse fluctuation due to a bit error over the transmission line as an out-of frame and a rear stabilizing function for preventing it from performing an incorrect synchronization due to an incorrect determination. Normally, the number of stages of a counter for a front synchronization stabilizer which accomplishes the front stabilizing function is larger than that for a rear synchronization stabilizer which accomplishes the rear stabilizing function.

Conventionally, the front synchronization stabilizer is provided with a match and mismatch detection circuit for outputting a match pulse or a mismatch pulse depending upon whether a data pattern in an area around the beginning of each received frame, in which area a synchronization pattern should be stored (hereinafter, this area is referred to as a synchronization pattern area), completely matches or mismatches a predetermined synchronization pattern. By the methods of counting the mismatch pulses or the match pulses which are outputted from the match and mismatch detection circuit frame by frame, the front synchronization stabilizer can be categorized as several types.

As one type of the front synchronization stabilizer, a reset counter type stabilizer is equipped with a mismatch counter for counting the number of mismatch pulses and for outputting a carry pulse when the counted value exceeds a particular value n (hereinafter, this value n is referred to as the counter size). The mismatch counter is reset by the match pulse and by the carry pulse. The carry pulse which is outputted from the mismatch counter is outputted as an out-of frame pulse for denoting that an out-of frame is detected. Thus, when n mismatch pulses are successively generated without generation of a match pulse, the out-of frame pulse is outputted.

While the frames are synchronized in the correct positions, if a bit error takes place due to a disturbance over the transmission line, the mismatch pulse is outputted and thereby the mismatch counter is incremented by one. However, while the frame synchronization is correctly made, since the match pulses are frequently outputted, the mismatch counter is reset before the counter value becomes the particular value n. Thus, the out-of frame pulse is not outputted. In other words, even if a disturbance takes place over the transmission line, the out-of frame hardly takes place.

On the other hand, when the frames are synchronized in the incorrect positions, since the mismatch pulse is outputted frame by frame, the mismatch counter continues counting until the counter value becomes the particular value n without being reset and thereby outputs the carry pulse which is the out-of frame pulse. Since the probability of matching data in the synchronization pattern area of each frame inputted with the particular synchronization pattern by chance and thereby for outputting the match pulse is very small, in most cases, the out-of frame pulse is outputted.

As another type of the front synchronization stabilizer, a racing counter type stabilizer is equipped with both a mismatch counter with size n for counting the number of mismatch pulses and for outputting a carry pulse when the count value becomes n and a match counter with size m for counting the number of match pulses and for outputting a carry pulse when the count value becomes a particular value m. The mismatch counter and the match counter are reset by the carry pulses being outputted therefrom. The carry pulse being outputted from the mismatch counter is outputted as an out-of frame pulse for denoting that an out-of frame is detected. As described above, the mismatch counter is reset when the number of mismatch pulses becomes the particular value m. Thus, in this type of the front synchronization stabilizer, when the density of the mismatch pulses in the successive frames including n mismatch pulses exceeds $n/(n+m-1)$, the out-of frame pulse is outputted. In the reset counter type front synchronization stabilizer, the threshold value of determining the out-of frame just depends on the size of the mismatch counter. However, since the racing counter type front synchronization stabilizer uses the above mentioned two counters, the threshold value of determining the out-of frame can be variably set and thereby the degree of freedom of this type stabilizer is higher than that of the other.

In the front synchronization stabilizer, the following two functions are generally required.

First Function

In case that the frames are synchronized in the correct positions, an out-of frame due to a disturbance over the transmission line has not occurred.

Second Function

In case that the frames are synchronized in the incorrect positions, an out-of frame is promptly detected.

Now, the first function of the reset counter type front synchronization stabilizer is described. The probability Perr of occurrence of an out-of frame due to a bit error in the state where the frames are synchronized in the correct positions is expressed as follows.

$$P_{err} = \{1-(1-p)^k\}^n$$

where k is the bit length of a synchronization pattern; p is a bit error rate; and n is the size of a mismatch counter.

To practically prevent an out-of frame due to a disturbance over the transmission line, the probability Perr should satisfy the following condition against a particular setting value X (hereinafter, the value X is referred to as the threshold value of synchronization determination).

$$P_{err} < X$$

Since the reception side cannot freely set the bit length k and the bit error rate p of the synchronization pattern, it is necessary to adjust the size n of the mismatch counter so as to satisfy the above condition. In other words, the size n should be determined so that the following expression is satisfied.

$$n > \log X / \log \{1-(1-p)^k\}$$

As an example, when $k=16$, $p=0.05$, and $X=1.0 \times 10^{-8}$ (this is a case where the frame period is $1 \times 10^{-3}$ and the probability of occurrence of a bit error is approximately once a day), n is defined as follows.

$$n > 31.75 \approx 32$$

Thus, the mismatch counter with a size of $n=32$ is required.

Next, the second function in the case of $n=32$ is described. When the frame period Tcic is $1.0 \times 10^{-3}$ sec, if the frames are synchronized in incorrect positions, the out-of frame detection time Tdet is expressed as follows.

$$Tdet \geq n \times Tcic \approx 32 \times 10^{-3} \text{ sec}$$

To shorten the out-of frame detection time Tdet, it is necessary to decrease the size n of the mismatch counter. However, if the size n of the counter is decreased, it is necessary to select a large value for the synchronization determination threshold value X and thereby the probability of occurrence of a synchronization determination error increases.

The first function of the racing counter type front synchronization stabilizer is hereinafter described. While the frames are synchronized in the correct positions, the probability Perr of occurrence of out-of frame due to a bit error is expressed by the following expression.

$$Perr = \sum_{j=1}^{m-1} {}_{n+j}C_j \{1 - (1-p)^k\}^n \{(1-p)^k\}^j$$

The size n of the mismatch counter for satisfying the condition of Perr<X becomes larger than that of the reset counter type front synchronization stabilizer. In addition, the same problem with respect to the relationship between the out-of frame detection time Tdet and the threshold value of synchronization determination X as that of the reset counter type front synchronization stabilizer takes place.

As described above, according to the conventional front synchronization stabilizer, the threshold value of synchronization determination X can be freely selected. However, when the size n of the mismatch counter is set to a large value so as to decrease the synchronization determination error due to an instantaneous bit error over the transmission line, the speed of the out-of frame detection becomes slow. In contrast, when the size n of the mismatch counter is set to a small value so as to increase the speed of the out-of frame detection, the synchronization determination errors increases. Namely, the first function and the second function are contradictory. When one of the two functions has priority to the other, the other function is sacrificed.

There is a transmission system for transmitting data where the same pattern as a synchronization pattern appears in data in each frame. In such a system, a synchronization pattern is identified with data containing the same pattern by previously inverting the synchronization pattern frame by frame. In this system, the reception side alternately inverts again received synchronous patterns so as to form a non-inverted synchronization pattern stream. However, when the frames are synchronized in the incorrect positions, for example, in the position of the data pattern which is the same as the synchronization pattern, an alternately inverted synchronization pattern stream are obtained rather than a non-inverted synchronization pattern stream. When such a synchronization pattern stream is inputted to the conventional reset counter type front synchronization stabilizer, match pulses are detected on the alternate frames and thereby the mismatch counter is reset. Thus, even while the frames are synchronized in the incorrect positions, an out-of frame does not take place and thereby the front stabilizing function does not work.

On the other hand, with respect to the conventional racing counter type front synchronization stabilizer, unless the size m of the match counter is larger than the size n of the mismatch counter (that is, unless m>n), an out-of frame does not take place and thereby the front stabilizing function does not work. If m>n, however, the synchronization of frames cannot be stably maintained. The reason why the above situation takes place is as follows.

When the bit length of synchronization pattern k is 16, the bit error rate p is 0.05, the threshold value of synchronization determination X is $1 \times 10^{-8}$, and the size of match counter m is 10, the size of mismatch counter n is also represented with the above mentioned expression as follows.

$$X > \sum_{j=1}^{m-1} {}_{n+j}C_j \{1 - (1-p)^k\}^n \{(1-p)^k\}^j$$

Thus, $n \geq 63$. Consequently, the above mentioned condition m>n is not satisfied. In other words, in case that the bit error rate p is a large value, that is, p=0.05, if it is set as m>n, the synchronization of frames cannot be maintained. In the match and mismatch detection circuit, the probability of matching the synchronization patterns becomes $(1-)^k = 0.44$, while the probability of mismatching the synchronization patterns becomes $1-(1-p)^k = 0.56$ (where k=16 and p=0.05). Thus, the probability of mismatching the synchronization patterns is higher than that of matching the synchronization patterns. In other words, in stably maintaining the synchronization, the relationship of m<n always takes place. When the relationship of m>n is set, the function can be used only in the area where the bit error rate is low.

SUMMARY OF THE INVENTION

It is, therefore, an object of the present invention to provide a frame synchronization stabilizer which can select the threshold value of synchronization determination X for preventing an incorrect determination against a disturbance over a transmission line when frames are synchronized in correct positions and for promptly detecting an out-of frame when frames are synchronized in incorrect positions.

Another object of the present invention is to provide a frame synchronization stabilizer which correctly operates even if the bit error rate is high.

According to the present invention, the above object can be accomplished by a frame synchronization stabilizer for stabilizing frame synchronization of received data having a generation circuit for generating a reference pattern which is the same as a predetermined frame synchronization pattern contained in data being transmitted. The stabilizer further has a comparison circuit for comparing, bit by bit, a data pattern in a synchronization pattern area of each frame of the received data with the reference pattern from the generation circuit. The comparison circuit outputs a mismatch pulse each time when a mismatch bit is detected by the comparison, and outputs a match pulse each time when it is detected that the data pattern is fully matched with the reference pattern. The number of the mismatch pulses from the comparison circuit is counted by a first counter. The first counter outputs an out-of frame detection signal when a counted value exceeds a particular value and is reset based upon the match pulse from the comparison circuit.

The reception side generates a reference pattern which is the same as a predetermined synchronization pattern contained in data being transmitted. The generated reference pattern is compared with a data pattern in a synchronization pattern area of each received frame bit by bit. In the comparison, each time a mismatch of each bit is detected, a mismatch pulse is outputted. The mismatch pulses are counted by the first counter. Each time it is detected that the data pattern is fully matched with the reference pattern, a match pulse is outputted and the counter is reset in accordance with the match pulse.

It is preferable that the first counter is reset by the match pulse outputted from the comparison circuit.

It is preferable that the first counter is also reset by the out-of frame detection signal outputted from itself.

It is preferable that the stabilizer further has a second counter for counting the number of the match pulses from the comparison circuit. The second counter outputs a signal when a counted value exceeds a particular value. Both of the first and second counters may be reset by the signal outputted from the second counter. Both of the first and second counters may be also reset by the out-of frame detection signal outputted from the first counter.

It is preferable that the generation circuit has a synchronization pattern generator for generating a parallel reference pattern, and a circuit for converting the parallel reference pattern to a serial reference pattern.

The converting circuit may be a PISO (Parallel-In-Serial-Out) shift register.

It is preferable that the comparison circuit has a pattern comparison circuit for outputting a match pulse each time when it is detected that the data pattern is fully matched with the reference pattern, and a bit comparison circuit for outputting a mismatch pulse each time when a mismatch bit is detected by comparing, bit by bit, a data pattern in a synchronization pattern area of each frame of the received data with the reference pattern from the generation circuit.

The comparison circuit may have a pattern comparison circuit for outputting a match pulse each time when it is detected that the data pattern is fully matched with the parallel reference pattern, and a bit comparison circuit for outputting a mismatch pulse each time when a mismatch bit is detected by comparing, bit by bit, a data pattern in a synchronization pattern area of each frame of the received data with the serial reference pattern from the generation circuit.

The bit comparison circuit may have an exclusive OR gate receiving the data pattern in series and the serial reference pattern. The exclusive OR gate outputs the mismatch pulse each time when one bit of the data pattern and one bit of the serial reference pattern.

Further objects and advantages of the present invention will be apparent from the following description of the preferred embodiments of the invention as illustrated in the accompanying drawings.

DESCRIPTION OF THE PREFERRED EMBODIMENTS

Figure 1:
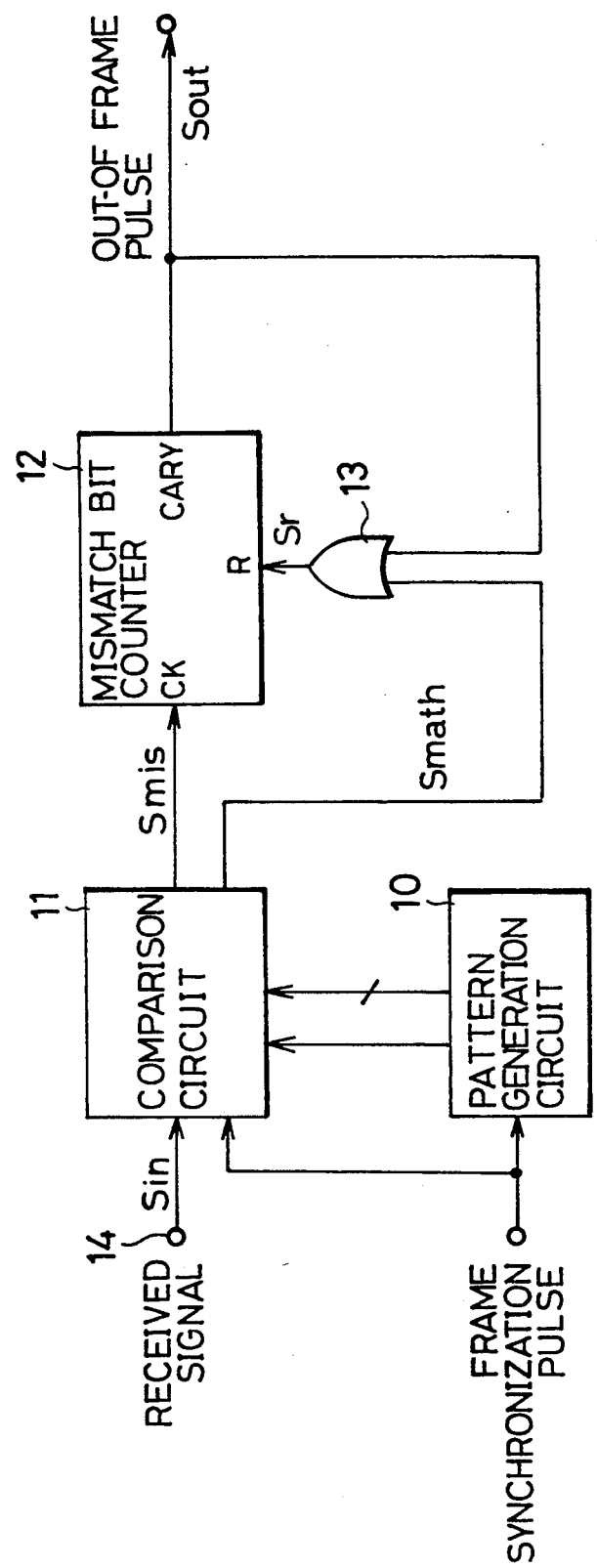
FIG. 1 schematically shows a construction of an embodiment of a frame synchronization stabilizer according to the present invention.

FIG. 1 schematically shows a construction of a reset counter type front synchronization stabilizer as a preferred embodiment of a frame synchronization stabilizer according to the present invention.

In the figure, reference numeral 10 denotes a synchronization pattern generation circuit. The pattern generation circuit 10 is connected to a comparison circuit 11 to which a received signal is applied. The comparison circuit 11 is connected to a mismatch bit counter 12 for counting the number of mismatch pulses Smis and an OR gate 13 whose output is connected to a reset input terminal R of the mismatch bit counter 12. A carry output terminal CARY of the mismatch bit counter 12 is connected to an input of the OR gate 13.

The pattern generation circuit 10 generates a reference synchronization pattern having the same pattern as a frame synchronization pattern added on the transmission side. Both the reference synchronization pattern from the pattern generation circuit 10 and the received signal Sin from an input terminal 14 are applied to the comparison circuit 11. The comparison circuit 11 compares, bit by bit, the signal pattern in the synchronization pattern area of each received frame with the reference synchronization pattern. Then, the circuit 11 outputs a mismatch pulse Smis each time when it detects a mismatch bit, and outputs a match pulse Smath each time when it detects that the input signal pattern is fully matched with the reference synchronization pattern. In an example where the length of the synchronization pattern is set to 16 bits, if there are three mismatch bits, the comparison circuit 11 outputs three mismatch pulses. Only when all the 16 bits of the input signal pattern matches those of the reference synchronization pattern, the comparison circuit 11 outputs one match pulse Smath.

The mismatch pulses Smis being outputted are applied to an clock input terminal CK of the mismatch bit counter 12. On the other hand, the match pulse Smath is applied to the reset input terminal R of the counter 12 through the OR gate 13. The counter 12 counts the number of received mismatch pulses Smis and outputs a carry pulse from the carry output terminal CARY when the count value becomes a particular value N (hereinafter, the value N is referred to as the counter size). The carry pulse is outputted as a pulse Sout which denotes that an out-of frame is detected. The out-of frame pulse Sout is also applied to the reset input terminal R of the counter 12 through the OR gate 13. Thus, the counter 12 is reset by the out-of frame pulse Sout and by the match pulse Smath. When reset, the mismatch bit counter 12 starts counting the number of the mismatch pulses Smis from "0". Therefore, the out-of frame pulse Sout is outputted when N mismatch pulses Smis are successively generated without generation of the match pulse Smath. When the out-of frame pulse Sout is generated, a reframing is executed in a known method.

Figure 2:
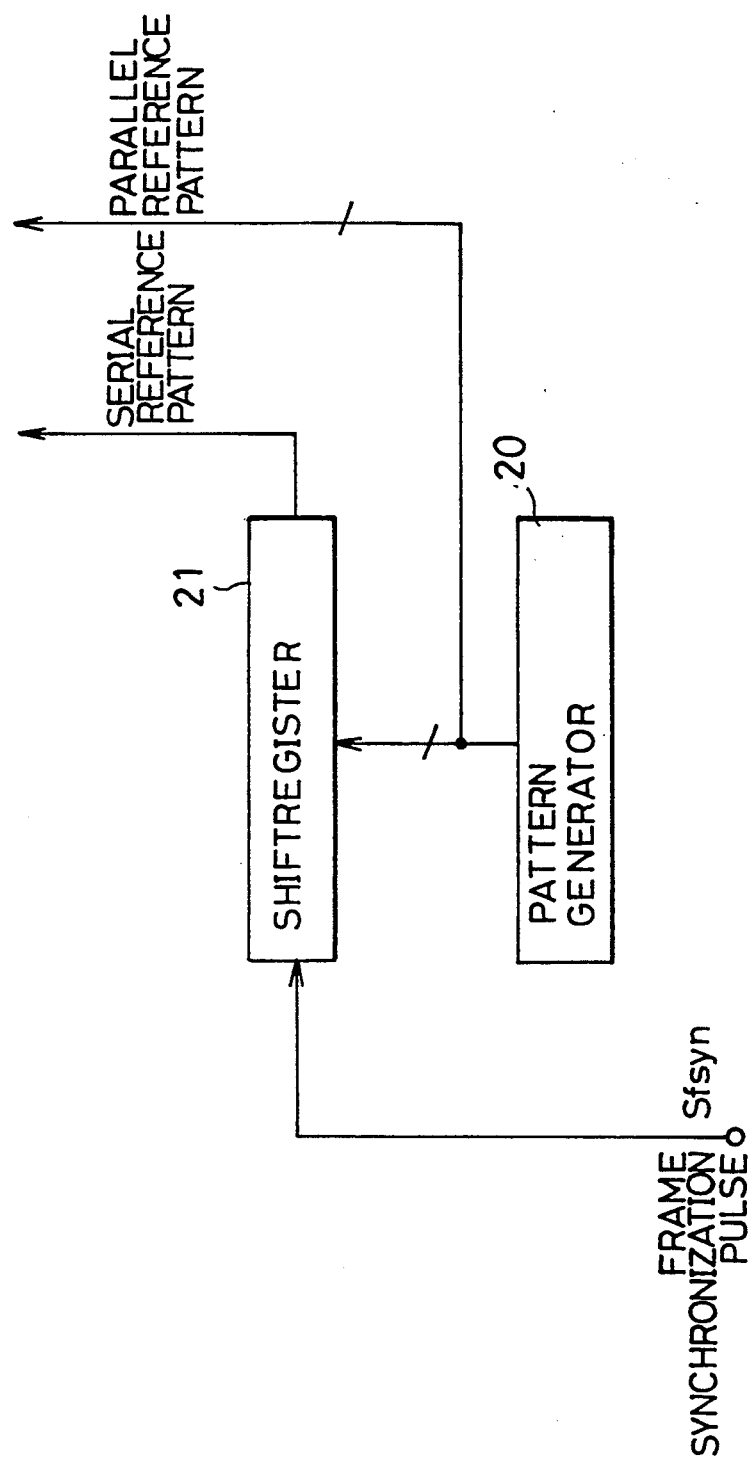
FIG. 2 schematically shows an electrical construction of an example of a synchronization pattern generation circuit of the embodiment shown in FIG. 1.

FIG. 2 shows an example of a construction of the pattern generation circuit 10 in accordance with the embodiment shown in FIG. 1. As shown in FIG. 2, the pattern generation circuit 10 is equipped with a pattern generator 20 and a shift register 21 which is connected thereto. The pattern generator 20 generates and outputs in parallel a reference synchronization pattern having the same pattern as a frame synchronization pattern added on the transmission side, for example, the length of the reference synchronization pattern being 16 bits. The parallel reference synchronization pattern being outputted is applied to both the shift register 21 and the comparison circuit 11 (FIG. 1). The shift register 21 which is a PISO (Parallel-In-Serial-Out) shift register receives the parallel reference synchronization pattern from the pattern generator 20 each time when the frame synchronization pulse Sfsyn is received and then outputs the reference synchronization pattern in series in accordance with a clock pulse of the reception system. The serial reference synchronization pattern being outputted is applied to the comparison circuit 11 (FIG. 1).

When the bit length of the reference synchronization pattern is relatively short, that is, 16 bits, the shift register is used as shown in FIG. 2. However, when the bit length is long, a ROM or synchronization frame demultiplexing circuit may be used instead of the shift register.

Figure 3:
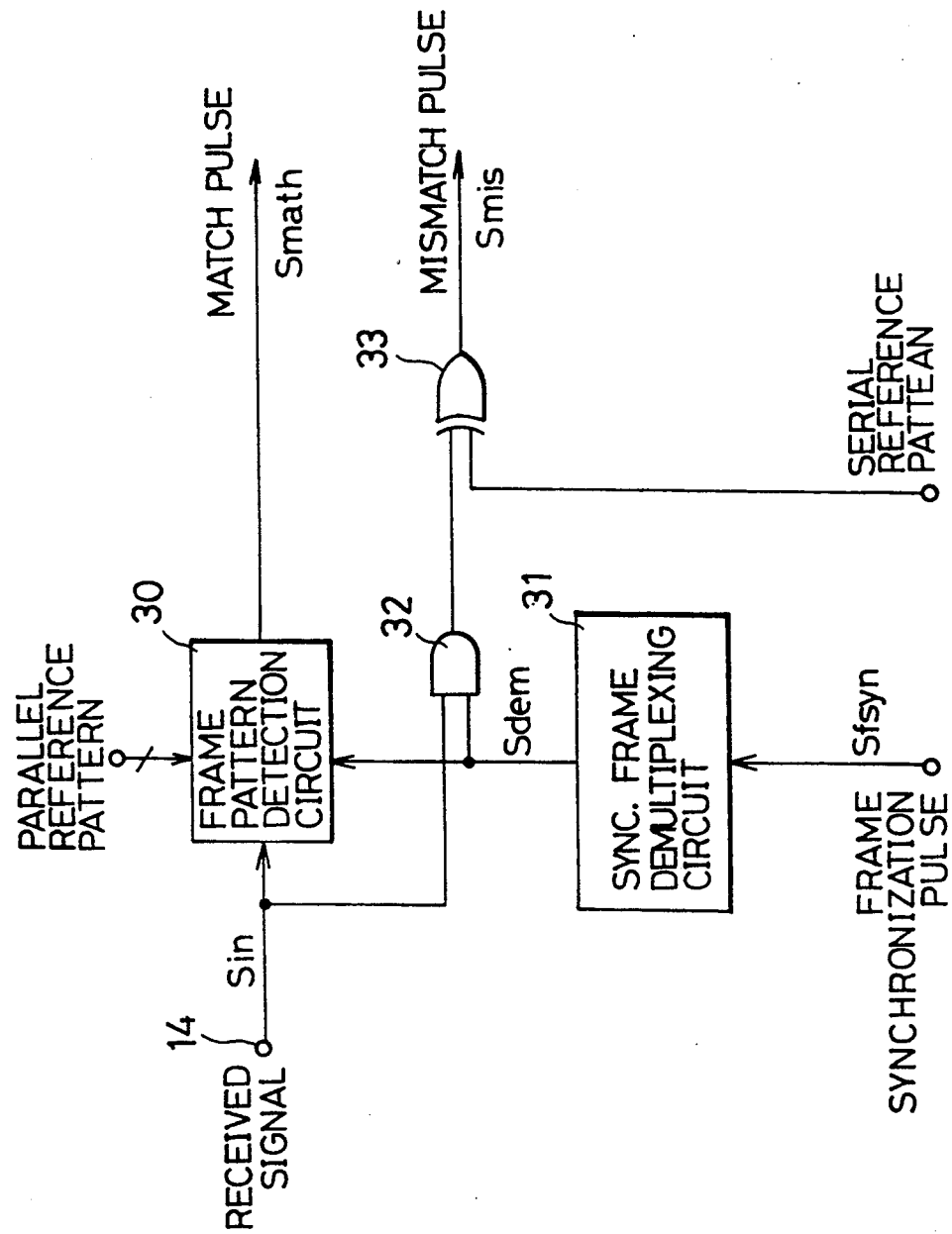
FIG. 3 schematically shows an electrical construction of an example of a comparison circuit of the embodiment shown in FIG. 1.

FIG. 3 shows an example of a construction of the comparison circuit 11 in accordance with the embodiment shown in FIG. 1.

As shown in FIG. 3, the comparison circuit 11 is equipped with a frame pattern detection circuit 30 connected to the input terminal 14, a synchronization frame demultiplexing circuit 31 connected to the frame pattern detection circuit 30, an AND gate 32 whose one input terminal is connected to an output terminal of the demultiplexing circuit 31, other terminal being connected to the input terminal 14, and an XOR (Exclusive OR) gate 33 whose one input terminal is connected to an output terminal of the AND gate 32. The other input terminal of the XOR gate 33 receives the serial reference synchronization pattern sent from the pattern generation circuit 10.

Figure 4:
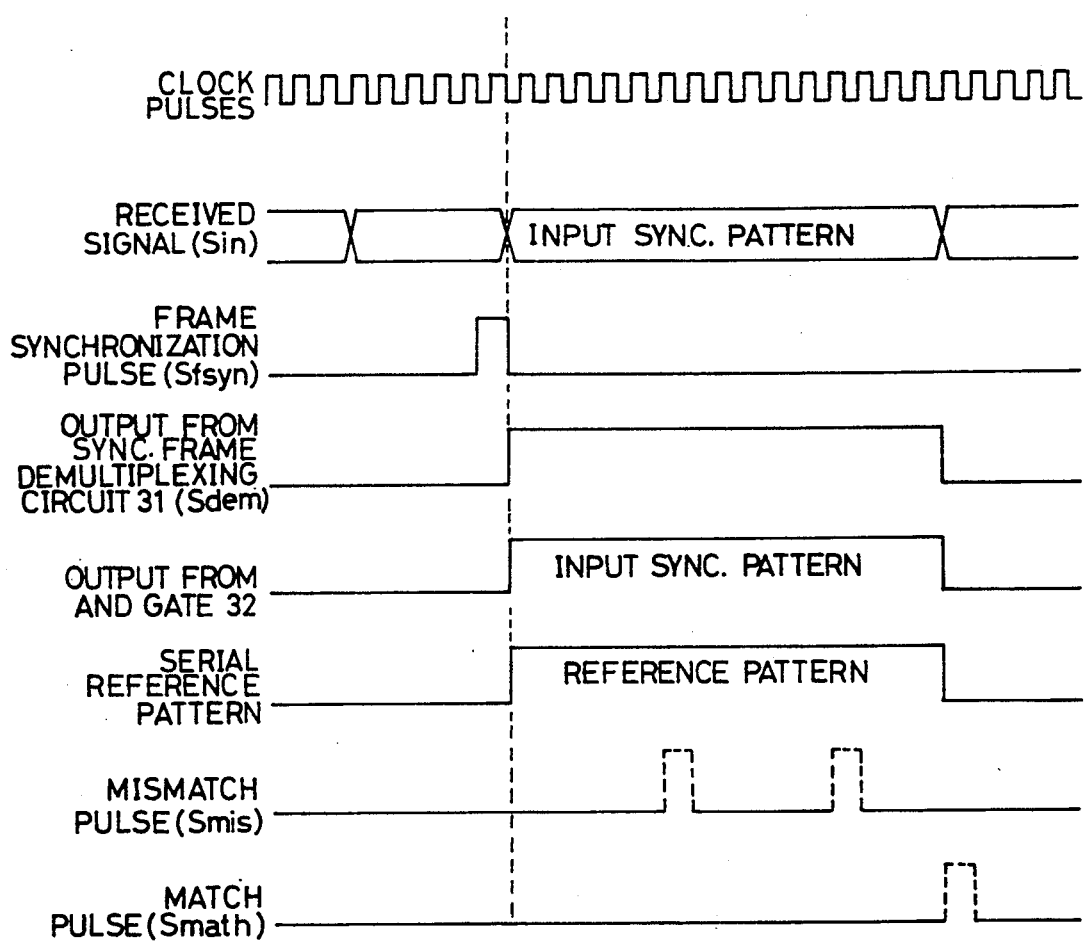
FIG. 4 shows a signal waveform of each portion of the circuits shown in FIGS. 2 and 3.

FIG. 4 is a time chart showing a signal waveform of each portion of the circuits shown in FIGS. 1 to 3.

As shown in FIG. 4, when the frame synchronization pulse Sfsyn is applied to the demultiplexing circuit 31, it generates an output Sdem whose signal level is high for the bit length of the frame synchronization pattern added on the transmission side. The output Sdem is sent to the frame pattern detection circuit 30 and the AND gate 32. Thus, while the signal level of the output Sdem is high, the received signal Sin is applied to the XOR gate 33 in series through the AND gate 32. In the XOR gate 33, the received signal Sin is compared, bit by bit, with the serial reference synchronization pattern from the pattern generator 20. Each time when a bit of the input synchronization pattern contained in the received signal Sin is mismatched with that of the serial reference synchronization pattern, the mismatch pulse Smis is outputted from the XOR gate 33.

The frame pattern detection circuit 30 has the same construction as a known and conventional pattern detection circuit. While the signal level of the output Sdem sent from the demultiplexing circuit 31 is high, the received signal Sin, which is the 16-bit input pattern, is compared with the parallel reference synchronization pattern sent from the pattern generator 20. When all the bits of the 16-bit input pattern are matched with those of the parallel reference synchronization pattern, a match pulse Smath is outputted. The frame pattern detection circuit 30 can be constructed with a register and a magnitude comparator, for example.

It is possible to dispose the AND gate 32 in another position other than that shown in FIG. 3. In addition, it is also possible to demultiplex the synchronization frame by using a counter which is enabled with the output Sdem from the synchronization frame demultiplexing circuit 31.

The operations of the front synchronization stabilizer of the embodiment in both the cases where the frames are synchronized in the correct positions and where the frames are synchronized in the incorrect positions are hereinafter described.

In the Case Where the Frames are Synchronized in the Correct Positions

If there is no bit error, each time when one frame of the received signal Sin is inputted form the input terminal 14, the match pulse Smath is outputted whereas the mismatch pulse Smis is not outputted. When a bit error takes place due to a disturbance over the transmission line, a mismatch bit is detected. Each time when a mismatch bit is detected, a mismatch pulse Smis is outputted. The mismatch bit counter 12 counts the number of the mismatch pulses Smis. However, when the frames are synchronized in the correct positions, the match pulses Smath are frequently outputted. Thus, before the count value becomes the particular value N, the mismatch bit counter 12 is reset with the match pulse Smath. Thus, the out-of frame pulse Sout is not outputted. Consequently, even if a disturbance over the transmission line takes place, an out-of frame hardly takes place.

In the Case Where the Frames are Synchronized in the Incorrect Positions

In this case, since a mismatch bit takes place with a probability of 50%, the probability of matching both the synchronization patterns is usually very low. Thus, the mismatch bit counter 12 counts N mismatch pulses Smis and outputs the out-of frame pulse Sout.

As was described above, in the front synchronization stabilizer, the following two functions are required.

First Function

In case the frames are synchronized in the correct positions, an out-of frame has not occurred due to a disturbance over the transmission line.

Second Function

In case the frames are synchronized in the incorrect positions, an out-of frame is promptly detected.

The first function in accordance with the embodiment is described in the following. The probability Pe1 of detecting one mismatch bit in the state where the frames are synchronized in the correct positions is expressed with the following equation.

$$Pe1 = {}_kC_1 p (1-p)^{k-1}$$

where k is the bit length of the synchronization pattern and p is the bit error rate.

Likewise, the probability Pe2 of detecting two mismatch bits is expressed with the following equation.

$$Pe2 = {}_kC_2 p^2 (1-p)^{k-2}$$

At that time, two mismatch pulses Smis are outputted.

Generally, the probability Pej of detecting j mismatch bits is expressed with the following equation.

$$Pej = {}_kC_j p^j (1-p)^{k-j}$$

At that time, j mismatch pulses Smis are outputted. Thus, the average quantity Peave of the mismatch pulses Smis which are outputted per frame is expressed with the following equation.

$$Peave = \sum_{j=1}^{k} j \times {}_kC_j p^j (1-p)^{k-j}$$

On the other hand, the probability Pe0 of occurrence of a mismatch bit per frame is expressed with the following equation.

$$Pe0 = 1 - (1-p)^k$$

Thus, when a mismatch of the synchronization pattern takes place, the mismatch bit counter counts (Peave/Pe0) mismatch pulses Smis on the average. When $k=16$, $p=0.05$, and $X=1.0 \times 10^{-8}$, since Peave $\simeq 0.84$ and Pe0 $\simeq 0.56$, the following result is obtained.

$$Peave/Pe0 \simeq 1.428.$$

In other words, according to the embodiment, when one mismatch of the synchronization patterns takes place, 1.428 mismatch pulses Smis are counted. With respect to the related art, as was described above, in the same numerical conditions (that is, $k=16$, $p=0.05$, and $X=1.0 \times 10^{-8}$), the required size n of mismatch counter was $n > 31.75 \simeq 32$. To obtain the performance equivalent to the related art, the mismatch bit counter 12 according to the present invention should output one mismatch pulse Smis at each time when 31.75 mismatches of the synchronization patterns successively take place on the average. In other words, since $31.75 \times 1.428 \simeq 45.34$, the size N of the mismatch bit counter 12 should be 46.

Next, the second function in the case where the size N of the mismatch bit counter 12 is set to 46 is described. In the case where the probabilities of occurrences of binary codes "0" and "1" are 50% and 50%, respectively, the number of mismatch bits against one synchronization pattern having bit length of 16 is 8 bits on the average. Thus, when the frame period $Tcic = 1.0 \times 10^{-3}$ sec, in the case where the frames are synchronized in the incorrect positions, the time Tdet for detecting an out-of frame is represented with the following expression.

$$Tdet \geq (N/8) \times Tcic \simeq 5.75 \times 10^{-3} \text{ sec}$$

If the mismatch bit counter 12 is not reset while the N mismatch pulses Smis are counted, the time Tdet is expressed with the following equation.

$$Tdet = (N/8) \times Tcic$$

During counting N mismatch pulses, the probability of matching the synchronization patterns by chance is low. Therefore, the time Tdet for detecting an out-of frame becomes approximately 5.8 msec, which is about 1/5 of 32 msec of the related art. Thus, the performance of the second function of the embodiment is remarkably improved and thereby the restoration to the correct synchronization state can be performed in a very short time.

As was described above, according to the embodiment, when the frames are synchronized in the correct positions, an incorrect determination of synchronization against a disturbance over a transmission line hardly takes place. When the frames are synchronized in the incorrect positions, an out-of frame can be more promptly detected than the related art. In addition, since the mismatch bit counter 12 counts the number of mismatch bits, the degree of freedom of selecting the threshold value X of synchronization determination is high as well as the conventional front synchronization stabilizer.

Figure 5:
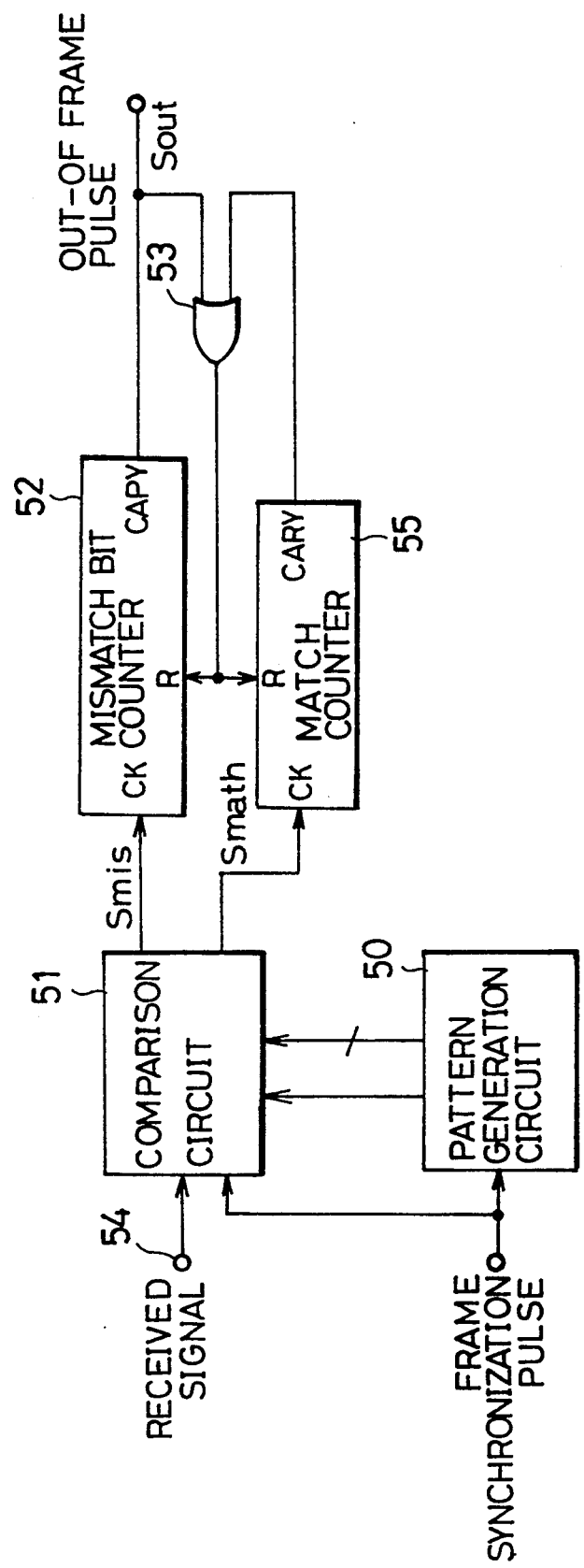
FIG. 5 schematically shows a construction of another embodiment of a frame synchronization stabilizer according to the present invention.

FIG. 5 schematically shows a construction of a racing counter type front synchronization stabilizer of another embodiment of the frame synchronization stabilizer according to the present invention.

As shown in FIG. 5, a synchronization pattern generation circuit 50 is connected to a comparison circuit 51 to which a received signal is applied. The comparison circuit 51 is connected o both a mismatch bit counter 52 for counting a mismatch pulse Smis and a match counter 55. Reset input terminals R of the counters 52 and 55 are connected to an output terminal of an OR gate 53. Input terminals of the OR gate 53 are connected to carry output terminals CARY of the counters 52 and 55.

The pattern generation circuit 50 generates a reference synchronization pattern having the same pattern as a frame synchronization pattern added on a transmission side. The reference synchronization pattern from the circuit 50 and a received signal Sin from an input terminal 54 are applied to the comparison circuit 51. The circuit 51 compares, bit by bit, a signal pattern in a synchronization pattern area of each received frame with the reference synchronization pattern. The circuit 51 outputs a mismatch pulse Smis each time when it detects a mismatch bit, and outputs a match pulse Smath each time when it detects that the input signal pattern is fully matched with the reference synchronization pattern. When the length of the synchronization pattern is 16 bits, if there are three mismatch bits, the comparison circuit 51 outputs three mismatch pulses Smis. On the other hand, only when all 16 bits of the input signal pattern are matched with those of the reference synchronization pattern, the comparison circuit 51 outputs one match pulse Smath.

The mismatch pulses Smis outputted in the above mentioned manner are applied to a clock input terminal CK of the mismatch bit counter 52. On the other hand, the match pulse Smath is applied to a clock input terminal CK of the match counter 55. The counter 52 counts the number of received mismatch pulses Smis and outputs a carry pulse from the carry output terminal CARY when the count value becomes a particular value N. The carry pulse is outputted as a pulse Sout which denotes that an out-of frame is detected. The counter 55 counts the number of received match pulses Smath and outputs a carry pulse from the carry output terminal CARY when the count value becomes a particular value M. The out-of frame pulse Sout from the mismatch bit counter 52 and the carry pulse from the match counter 55 are applied to the reset input terminals R of the counters 52 and 55. Thus, the counters 52 and 55 are reset with the out-of frame pulse Sout from the counter 55 and the carry pulse from the counter 55, respectively. When the counters 52 and 55 are reset, they start counting the number of the mismatch pulses Smis and that of the match pulses Smath from "0", respectively. The out-of frame pulse Sout is outputted only when N mismatch pulses Smis are successively generated without generation of the carry pulse from the match counter 55. When the out-of frame pulse Sout is generated, a reframing is executed in a known method.

The constructions and the operations of the pattern generation circuit 50 and the comparison circuit 51 are the same as those of the embodiment shown in FIG. 1 (see FIGS. 2 and 3).

As was described above, when the number of match pulses becomes the particular value M, the mismatch counter is reset. Therefore, in the front synchronization stabilizer according to the embodiment, the out-of frame pulse Sout is outputted when the density of the mismatch pulses Smis in successive frames including N mismatch pulses Smis exceeds N/(N+M−1). In the reset counter type front synchronization stabilizer of the embodiment shown in FIG. 1, the threshold value of out-of frame determination just depends on the mismatch bit counter 12. However, in the racing counter type front synchronization stabilizer, since the two counters 52 and 55 are provided, it is possible to variably set the threshold value X of out-of frame determination. Thus, the degree of freedom of this stabilizer is higher than that of the related art. In addition, as well as the embodiment shown in FIG. 1, when the frames are synchronized in the correct positions, an incorrect determination of synchronization due to a disturbance over the transmission line hardly takes place. When the frames are synchronized in the incorrect positions, an out-of frame can be more promptly detected than the related art.

Figure 6:
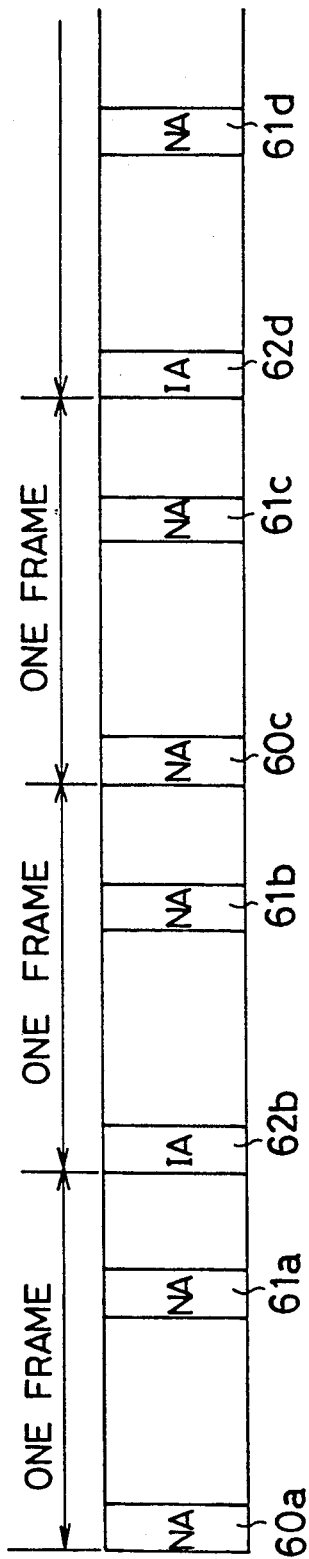
FIG. 6 shows an example of data format in a system where synchronization patterns are inverted on alternate frames.

FIG. 6 shows a transmission data format of another embodiment of the frame synchronization stabilizer according to the present invention.

In this embodiment, data in each frame having the same pattern as a synchronization pattern is transmitted after inverting the synchronization pattern frame by frame so that the synchronization pattern can be identified at the reception side. A racing counter type front synchronization stabilizer shown in FIG. 5 is used in this embodiment.

As shown in FIG. 6, a data stream with data patterns 61a, 61b, 61c, 61d, . . . , etc. which have a pattern NA same as synchronization patterns 60a, 60c, . . . , etc. disposed at the beginning of each frame but not the synchronization pattern is transmitted. In order to prevent such the data patterns 61a, 61b, 61c, 61d, . . . , etc. from being mistaken for correct synchronization pulses, the synchronization patterns 60a, 62b, 60c, 62d, . . . , are alternately inverted as shown by NA (normal pattern) and IA (inverted pattern) in FIG. 6 at the transmission side and then transmitted. In such the system, only the synchronization pattern portion should be inverted again at the reception side so as to form a non-inverted synchronization pattern stream.

Figure 7:
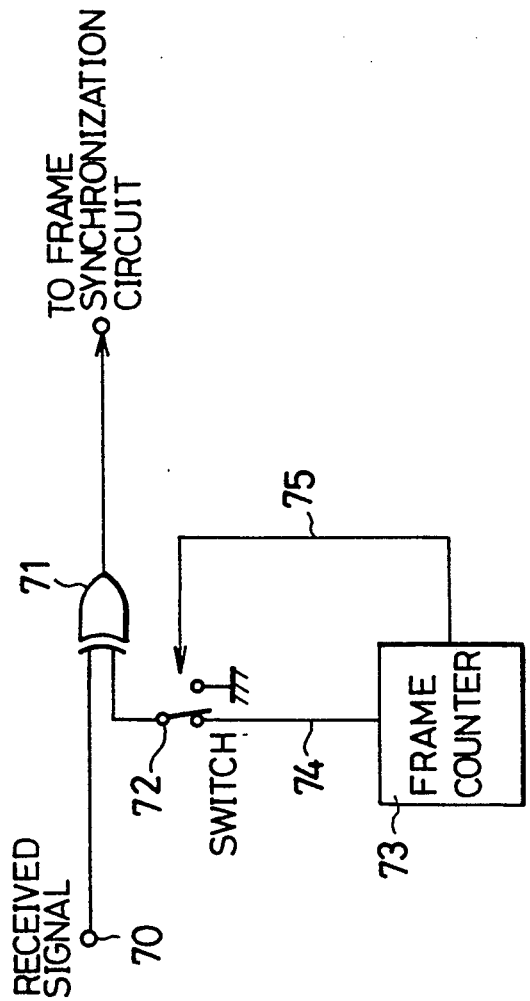
FIG. 7 shows an electrical construction of an example of a circuit for converting synchronization patterns inverted on alternate frames into non-inverted patterns.

FIG. 7 shows an example of a re-inversion circuit disposed upstream of the racing counter type front synchronization stabilizer shown in FIG. 5. As shown in FIG. 7, a received signal inputted through an input terminal 70 is applied to one input terminal of an XOR gate 71, and a signal from a frame counter 73 through a switch 72 is applied to the other input terminal of the XOR gate 71. The frame counter 73 outputs a high level signal and a low level signal on alternate frames to the switch 72 through a line 72. When the synchronization pattern area at the beginning of each frame takes place, the control signal of the switch 72 places the switch 72 in the position connected to the frame counter 73. When other area takes place, the control signal places the switch 72 in the position connected to the ground side.

Therefore, if the frames are synchronized in the correct positions, the portion of the inverted pattern IA of the synchronization pattern is inverted again and thereby the normal pattern NA is outputted. On the other hand, the portion of the normal pattern NA, which has not been inverted, is outputted as it is. Consequently, the synchronization pattern portion is formed as non-inverted synchronization pattern stream. This pattern stream is sent to the racing counter type front synchronization stabilizer and then the synchronization is stabilized.

In this case, while the frames are synchronized in the correct positions, the probability of occurrence of an out-of frame becomes as follows. As was described above, in the conventional racing counter type front synchronization stabilizer, when the size m of mismatch counter is 10, the size n of match counter should be 63. In the same numerical conditions where k=16, p=0.05, and X=1×10⁻⁸, like the case of the embodiment shown in FIG. 1, the size N of the mismatch bit counter 52 in this embodiment becomes as follows.

$$N = 63 \times 1.428 \approx 90$$

If the size N of the mismatch bit counter 52 is 90, the probability X of occurrence of an out-of frame becomes approximately 1×10⁻⁸ or less.

On the other hand, if the frames are synchronized in the incorrect positions, namely, in the position of data patterns 61a, 61b, 61c, 61d, . . . , etc. which are the same pattern as the synchronization pattern in each frame by mistake, synchronization patterns NA, IA, NA, IA, . . .

, etc. alternately inverted are obtained instead of a non-inverted synchronization pattern stream. However, according to the embodiment, since the inverted pattern IA is appeared on alternate frames, approximately 16 mismatch pulses Smis (depending on the bit error rate p to some extent) are outputted on each frame having the inverted pattern IA. This causes the counter 52 to count about 16 mismatch pulses on each of the alternate frames. In case that the counter 52 starts counting operation from "0", the counter 52 will be overflowed by counting 90/16=5.6 frames of the inverted pattern IA on the average. Thus, the carry pulse, that is, the out-of frame pulse Sout is outputted. During that time, nearly the same number of normal pattern NA frames are received. However, since the size M of match counter 55 is 10, when the counter 55 starts counting operation from "0", it will not be overflowed. Thus, when the frames are synchronized in the incorrect positions, an out-of frame can be detected.

According to the related art, when a frame of the inverted pattern IA is received, only one mismatch pulse is outputted. In contrast, according to the embodiment, since k (nearly 16) mismatch pulses Smis are outputted and thereby the mismatch bit counter 52 counts the pulses at a speed approximately 16 times faster than that of the related art. In the related art, unless the size m of match counter is larger than the size n of mismatch counter (namely, m>n), an out-of frame does not take place and thereby the front stabilizing function does not work. However, according to the embodiment, such a condition is represented by the following relationship between the size M (number of count frames) of match counter 55 and the division N/k of the size N of mismatch bit counter 52 by the bit length k of synchronization pattern.

$$M > N/k$$

In the above numerical condition, the following value is obtained.

$$M = 10 > N/k \approx 5.6$$

As was described above, in the system where synchronization patterns are inverted in alternate frames, even if the bit error rate is high, the front stabilizing operation can be correctly accomplished.

Many widely different embodiments of the present invention may be constructed without departing from the spirit and scope of the present invention. It should be understood that the present invention is not limited to the specific embodiments described in the specification, except as defined in the appended claims.

What is claimed is:

1. A frame synchronization stabilizer for stabilizing frame synchronization of received data comprising:

means for generating a reference pattern which is the same as a predetermined frame synchronization pattern contained in data being transmitted;

comparison means for comparing, between corresponding bits successively, a data pattern in a synchronization pattern area of each frame of the received data with the reference pattern from said generation means, said comparison means outputting a mismatch pulse each time when a mismatch bit is detected by the comparison, and outputting a match pulse each time when it is detected that the data pattern is completely coincident with the reference pattern; and a first counter for counting the number of the mismatch pulses from said comparison means, said first counter outputting an out-of frame detection signal when a counted value exceeds a particular value, and said first counter being adapted to be reset when said comparison means has outputted a predetermined number of match pulses.

2. A frame synchronization stabilizer as claimed in claim 1, wherein said first counter for counting the number of the mismatch pulses from said comparison means outputs an out-of frame detection signal when a counted value exceeds a particular value and is reset by the match pulse outputted from said comparison means.

3. A frame synchronization stabilizer as claimed in claim 2, wherein said first counter is also reset by the out-of frame detection signal outputted from itself.

4. A frame synchronization stabilizer as claimed in claim 1, wherein said stabilizer further comprises a second counter for counting the number of the match pulses from said comparison means, said second counter outputting a signal when a counted value exceeds a particular value, both of said first and second counters being reset by the signal outputted from said second counter.

5. A frame synchronization stabilizer as claimed in claim 4, wherein both of said first and second counters are also reset by the out-of frame detection signal outputted from said first counter.

6. A frame synchronization stabilizer as claimed in claim 1, wherein said generation means includes a synchronization pattern generator for generating a parallel reference pattern, and means for converting the parallel reference pattern to a serial reference pattern.

7. A frame synchronization stabilizer as claimed in claim 6, wherein said converting means includes a PISO (Parallel-In-Serial-Out) shift register.

8. A frame synchronization stabilizer as claimed in claim 1, wherein said comparison means includes a pattern comparison circuit for outputting a match pulse each time when it is detected that the data pattern is fully matched with the reference pattern, and a bit comparison circuit for outputting a mismatch pulse each time when a mismatch bit is detected by comparing, bit by bit, a data pattern in a synchronization pattern area of each frame of the received data with the reference pattern from said generation means.

9. A frame synchronization stabilizer as claimed in claim 6, wherein said comparison means includes a pattern comparison circuit for outputting a match pulse each time when it is detected that said data pattern is fully matched with said parallel reference pattern, and a bit comparison circuit for outputting a mismatch pulse each time when a mismatch bit is detected by comparing, bit by bit, said data pattern in a synchronization pattern area of each frame of the received data with the serial reference pattern from said generation means.

10. A frame synchronization stabilizer as claimed in claim 9, wherein said bit comparison circuit includes an exclusive OR gate receiving said data pattern in series and said serial reference pattern, said exclusive OR gate outputting said mismatch pulse each time when one bit of said data pattern and one bit of said serial reference pattern is mismatched.

* * * * *